Dec. 13, 1938.    E. R. HILL    2,140,452
RAILWAY CAR TRUCK
Filed June 26, 1935    3 Sheets-Sheet 2
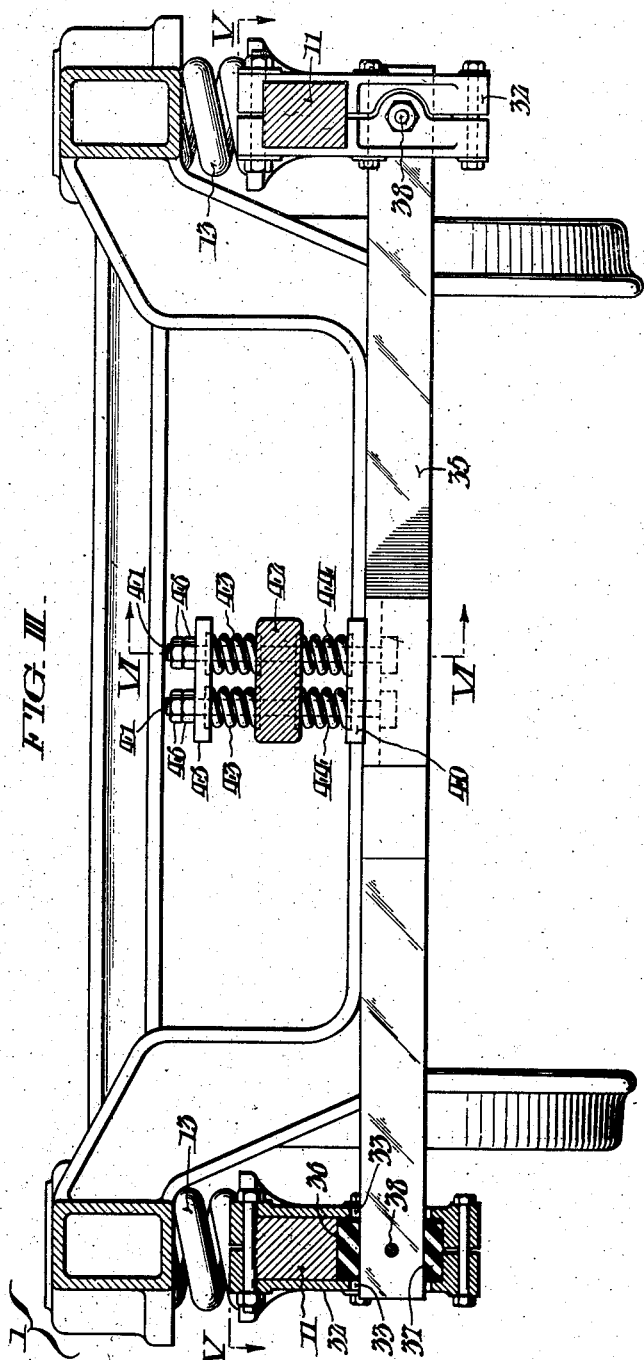
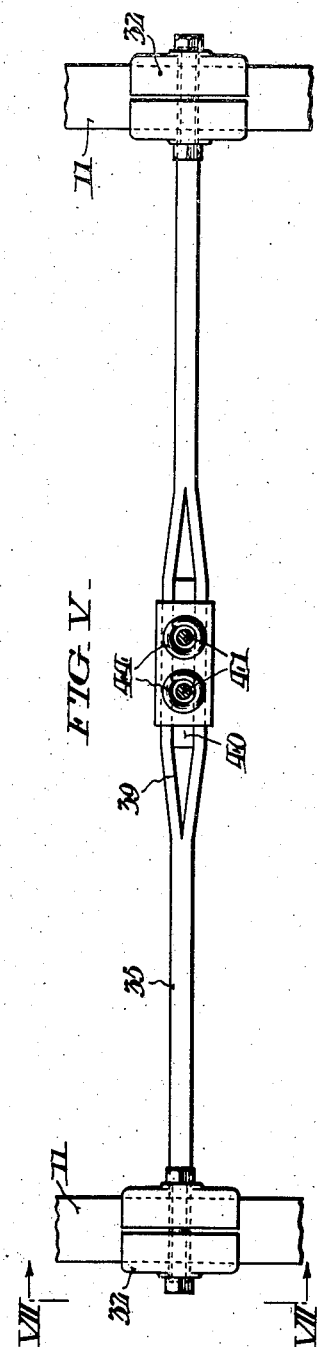
WITNESSES:
INVENTOR:
Ernest R. Hill,
BY
ATTORNEYS.

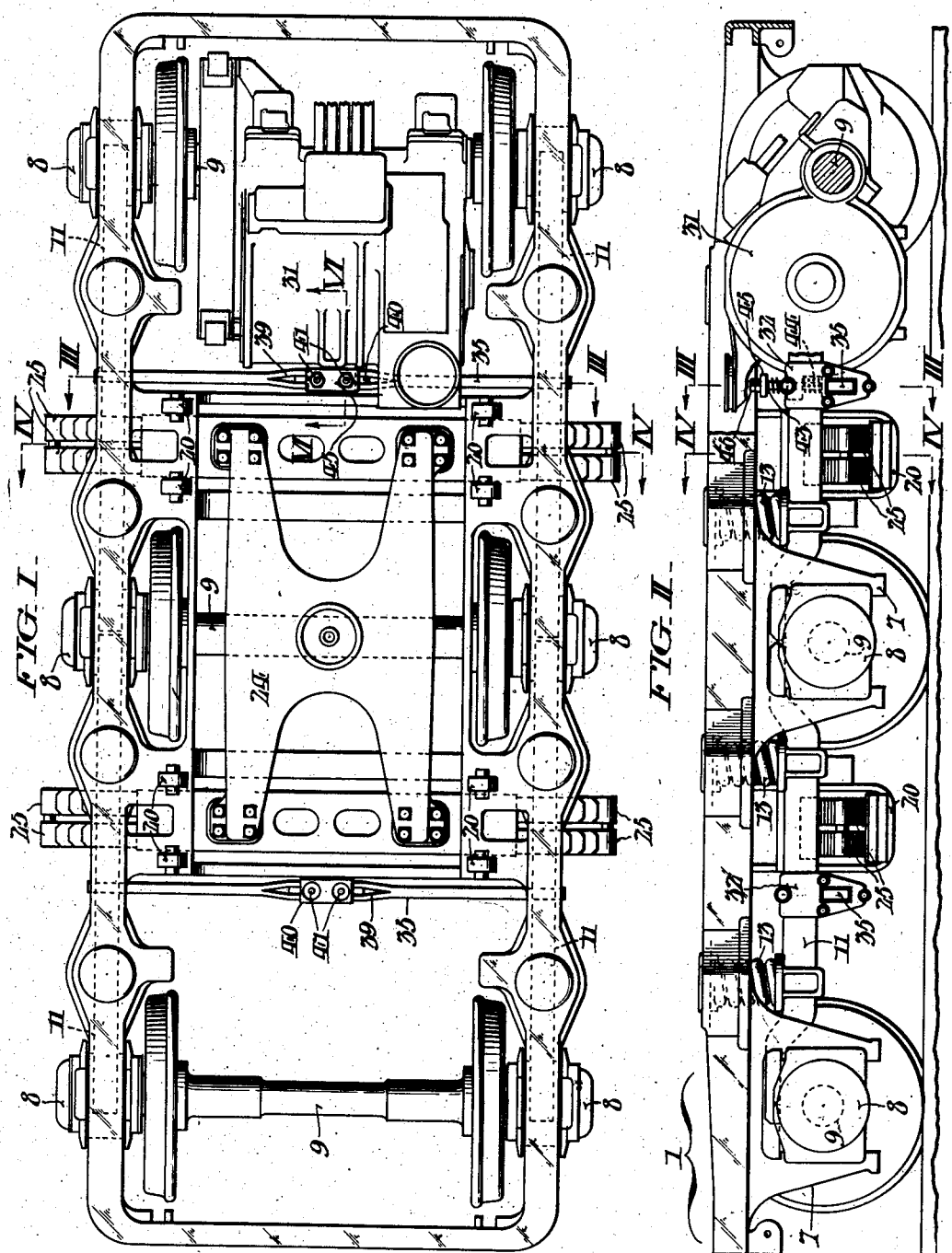

Dec. 13, 1938.　　　　　E. R. HILL　　　　　2,140,452
RAILWAY CAR TRUCK
Filed June 26, 1935　　　3 Sheets-Sheet 3
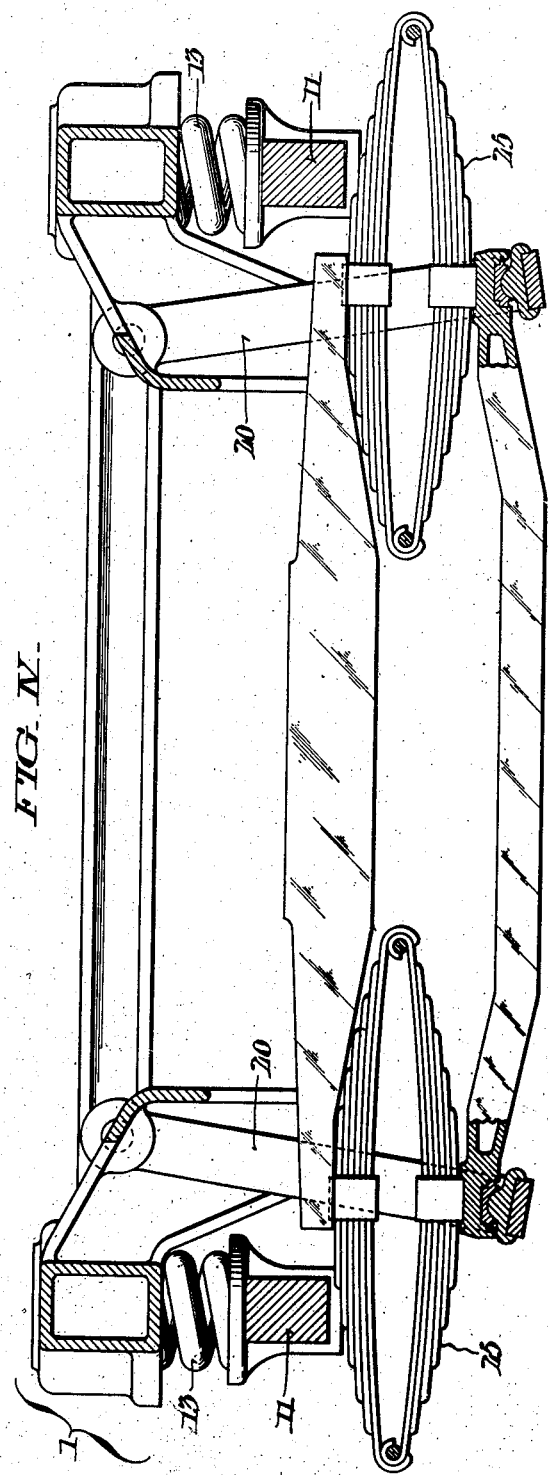
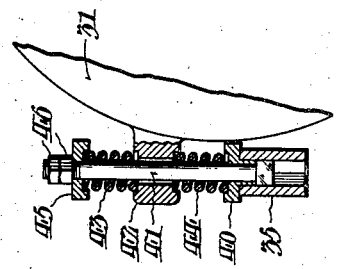
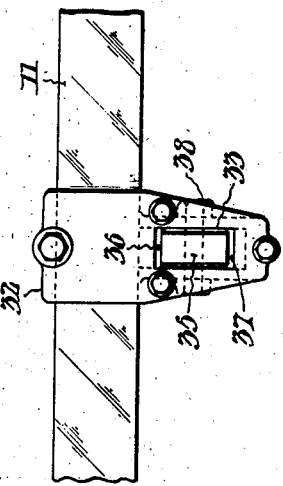
INVENTOR:
Ernest R. Hill,
BY *Tralley Paul*
ATTORNEYS.

Patented Dec. 13, 1938

2,140,452

UNITED STATES PATENT OFFICE 2,140,452

RAILWAY CAR TRUCK

Ernest R. Hill, East Orange, N. J., assignor to The Pennsylvania Railroad Company, Philadelphia, Pa., a corporation of Pennsylvania Application June 26, 1935, Serial No. 28,446

5 Claims. (Cl. 105—139)

This invention relates to railway car trucks, particularly electric motored car trucks for articulated train units.

The chief aims of my invention are to prevent the transmission of shocks and vibrations from the driving motors to the car springs; and in general to improve the riding qualities of electrically-motored car trucks.

The first of the foregoing advantages I realize in practice as hereinafter more fully disclosed, through provision of cross bars whereby the swinging ends of driving motors fulcrumed on the wheel axles of the truck are supported, the ends of these bars being supported in turn with interposition of resilient cushioning means, by the usual equalizer bars common to trucks of this character which bridge the journal boxes of adjacent wheel axles at opposite sides of the truck. The second advantage pointed out above, I secure by placing the aforesaid cross bars in parallel with the usual system of helical and elliptic springs for respectively sustaining the truck frame and the center plate, that the shocks and vibrations from the motors will not set the car springs into vibration.

Other objects and attendant advantages will appear from the following description of the drawings, wherein Fig. I is a plan view of a railway car truck embodying the present improvements.

Fig. II is a side elevation of the truck with a portion of one side broken away to expose important details of my invention.

Figs. III and IV are transverse sections taken as indicated respectively by the arrows III—III and IV—IV in Figs. I and II.

Fig. V is a fragmentary detail view in plan looking as indicated by the arrows V—V in Fig. III.

Fig. VI is a fragmentary detail sectional view taken as indicated by the arrows VI—VI in Fig. I; and Fig. VII is a fragmentary detail view looking as indicated by the arrows VII—VII in Fig. V.

The six wheeled railway truck chosen for the convenience of illustrating my invention, is of well known design and construction and includes an open rectangular frame 1 having pedestals 7 for the journal boxes 8 of the wheel axles 9 and being supported by a number of helical springs 13 which rest on the usual equalizer bars 11 at opposite sides of the truck. The center plate 24 of the truck is supported, after common practice, by transversely arranged elliptic springs 25 hung by stirrups 20 from the frame 1. The outer two of the three wheel axles 9 of the truck are arranged to be driven by electric motors of which only one is shown at 31 in Figs. I and II, the casing of the motor being fulcrumed for up and down swinging movement on the wheel axle.

In order to support the swinging ends of the motors without impartation of shocks or vibrations to the car springs, I have made provisions as follows:

Removably attached to the equalizer bars 11 in the intervals between the elliptic springs 25 and the outer axles 9 are connecting brackets 32 by which the ends of cross bars 35 are hung in suspension from said equalizer bars. As shown the brackets 32 are composed of complemental components which engage the equalizer bars 11 from opposite sides and which are drawn together by clamp bolts above and below said bars. As shown in Fig. III, the ends of the crossbars 35 are passed through aligned lateral clearance openings 33 in opposite sides of the brackets 32 and engage between resilient blocks 36, 37 of rubber or the like retained within hollows at the bottoms of said brackets. Cross bolts 38 serve to prevent endwise displacement of the cross bars relative to the hanger brackets 32. From Figs. I and V it will be observed that each of the cross bars 35 is longitudinally split and laterally expanded at the center with resultant provision of an elongate opening 39 into which an abutment block 40 is set and permanently secured by welding or in any other convenient manner. Fixed in the block 40 is a pair of spaced vertical stud bolts 41 which extend up through correspondingly-allocated guide openings in a "nose" projection 42 on the swinging end of the motor 31. Helical compression springs 43 and 44 surround the stud bolts 41 above and below the motor nose projection 42, the upper springs 43 bearing against an abutment plate 45 which is apertured for passage of the bolts, and which moreover is held in place by nuts 46 engaging threads at the tops of said bolts, see Figs. III, V and VI. Obviously, by adjusting the bolts 46 along the studs 41, the force of the springs 43 and 44 may be regulated as desired or required.

As a consequence of the above described construction, vibrations set up in the truck motors either from up and down movements of the wheels in passing over joints and irregularities in the rails, or from the action of the motor pinions on the truck gears, are absorbed by the springs 43 and 44 which are parallel to the car springs and therefore do not set up vibrations in the latter, since the cross bars 35 are carried with interposition of the shock absorbing blocks 36 and 37, by the equalizer bars 11, which, in turn, rest directly on the journal boxes 8.

Having thus described my invention, I claim:

1. Means for connecting the ends of motor-supporting cross bars to equalizer bars extending between wheel axles at opposite sides of a car truck, including vertically-split brackets formed respectively of components which engage the equalizer bars at opposite sides, the components of said brackets providing hollows, and retaining-blocks of resilient material in said hollows, for resiliently sustaining and cushioning the ends of the cross bars.

2. Means for connecting the ends of motor-supporting cross bars to equalizer bars extending between wheel axles at opposite sides of a car truck, including vertically-split brackets formed respectively by complemental components which engage the equalizer bars at opposite sides, said components providing hollows at a level different from that of the equalizer bars, retaining-blocks of resilient material in said hollows, for resiliently sustaining and cushioning the ends of the cross bars, and means for drawing the components of the brackets together above and below the equalizer bars.

3. Means for connecting the ends of motor-supporting cross bars to equalizer bars extending between wheel axles at opposite sides of the car truck, including vertically-split brackets which depend from the equalizer bars and which have hollows at their bottom ends, said brackets being respectively formed by complemental components which engage the equalizer bars at opposite sides, and retaining blocks of resilient material in the hollows of each bracket, the corresponding cross bar end being engaged between said blocks and sustained and cushioned by them, and means for drawing the components of said brackets together above and below said equalizer bars.

4. Motor-supporting means for railway car trucks comprising cross bars which constitute rests for the motors, cushioning means connecting the motors to the cross bars, vertically split brackets connecting the ends of the cross bars to equalizer bars extending between wheel axles at opposite sides of the truck, said brackets being respectively formed by clamp components which engage the equalizer bars at opposite sides and provide hollows, and retaining blocks of resilient material in said hollows, for resiliently sustaining and cushioning the ends of the cross bars.

5. Motor-supporting means for railway car trucks comprising cross bars which constitute rests for nose projections on motors pivoted on the wheel axles of the trucks, cushioning means connecting the motors to the cross bars, split brackets connecting the ends of the cross bars to equalizer bars extending between the wheel axles at opposite sides of the truck, said brackets being respectively formed by clamp components which engage the equalizer bars from opposite sides and provide hollows, and retaining-blocks of resilient material in the hollows of each bracket, the corresponding cross bar end being engaged between said blocks and sustained and cushioned by them.

ERNEST R. HILL.